(12) United States Patent
Ollivier (10) Patent No.: US 8,847,976 B2
(45) Date of Patent: Sep. 30, 2014

(54) CONVERTING A COLORIMETRIC TRANSFORM FROM AN INPUT COLOR SPACE TO AN OUTPUT COLOR SPACE

(75) Inventor: Pierre Jean Ollivier, Paris (FR)

(73) Assignee: Thomson Licensing, Boulogne-Billancourt (FR)

( * ) Notice: Subject to any disclaimer, the term of this patent is extended or adjusted under 35 U.S.C. 154(b) by 816 days.

(21) Appl. No.: 12/227,672

(22) PCT Filed: Jun. 2, 2006

(86) PCT No.: PCT/US2006/021485
§ 371 (c)(1),
(2), (4) Date: Nov. 24, 2008

(87) PCT Pub. No.: WO2007/142624
PCT Pub. Date: Dec. 13, 2007

(65) Prior Publication Data
US 2009/0174726 A1    Jul. 9, 2009

(51) Int. Cl.
*G09G 5/02* (2006.01)

(52) U.S. Cl.
USPC ........... 345/600; 345/589; 345/601; 345/604; 345/643; 382/167; 348/254; 348/674

(58) Field of Classification Search
None
See application file for complete search history.

(56) References Cited

U.S. PATENT DOCUMENTS

| | | | |
|---|---|---|---|
| 4,975,769 A | 12/1990 | Aizu et al. | |
| 4,994,901 A | 2/1991 | Parulski et al. | |
| 5,212,546 A | 5/1993 | Arazi et al. | |
| 5,233,684 A | 8/1993 | Ulichney | |
| 5,268,754 A | 12/1993 | Van de Capelle et al. | |
| 5,333,069 A | 7/1994 | Spence | |
| 5,377,041 A | 12/1994 | Spaulding et al. | |
| 5,416,614 A | 5/1995 | Crawford | |
| 5,541,742 A | 7/1996 | Imao et al. | |
| 5,568,596 A | 10/1996 | Cawley | |

(Continued)

FOREIGN PATENT DOCUMENTS

| EP | 1239668 | 9/2002 |
|---|---|---|
| EP | 1578140 | 9/2005 |

(Continued)

OTHER PUBLICATIONS

International Search Report, dated Mar. 27, 2007.

(Continued)

*Primary Examiner* — Antonio A Caschera
(74) *Attorney, Agent, or Firm* — Robert D. Shedd (57) ABSTRACT

A method, apparatus and system for transforming a calorimetric adjustment of a sequence of images from an input color space into an output color space includes a color adjustment device for determining a transformation table for converting the input color space of the sequence of images to an output color space, for applying a first order approximation to at least one subset of the sequence of images, the subsets of the sequence of images defined by the transformation table, and if the sequence of images has not reached convergence, for applying a second order approximation to at least one subset of the sequence of images. In one embodiment, the color components of the output color space are defined by a combination of intermediate terms, where the number of the intermediate terms corresponds to the number of input color space components. The transform is configured to survive a video distribution workflow.

25 Claims, 3 Drawing Sheets

(56) References Cited

U.S. PATENT DOCUMENTS

| | | | |
|---|---|---|---|
| 5,754,184 | A | 5/1998 | Ring et al. |
| 5,805,213 | A | 9/1998 | Spaulding et al. |
| 6,044,172 | A | 3/2000 | Allen |
| 6,100,999 | A | 8/2000 | Ikegami |
| 6,101,272 | A | 8/2000 | Noguchi |
| 6,243,133 | B1 | 6/2001 | Spaulding et al. |
| 6,351,320 | B1 | 2/2002 | Shin |
| 6,360,007 | B1 | 3/2002 | Robinson et al. |
| 6,421,142 | B1 | 7/2002 | Lin et al. |
| 6,445,874 | B1 | 9/2002 | Catlow |
| 6,560,358 | B1 | 5/2003 | Tsukada |
| 6,573,934 | B1 * | 6/2003 | Lee .................... 348/254 |
| 6,603,483 | B1 | 8/2003 | Newman |
| 6,621,604 | B2 | 9/2003 | De Lean |
| 6,707,938 | B2 | 3/2004 | de Queiroz et al. |
| 6,771,323 | B1 | 8/2004 | Dean et al. |
| 6,791,576 | B1 * | 9/2004 | Lin .................... 345/690 |
| 6,826,303 | B2 | 11/2004 | D'Souza et al. |
| 6,999,617 | B1 | 2/2006 | Ohga |
| 2002/0122044 | A1 | 9/2002 | Deering |
| 2002/0122194 | A1 | 9/2002 | Kuwata et al. |
| 2002/0140952 | A1 | 10/2002 | Fukasawa |
| 2002/0163657 | A1 | 11/2002 | Bogdanowicz et al. |
| 2002/0180892 | A1 | 12/2002 | Cacciatore et al. |
| 2003/0012427 | A1 | 1/2003 | Martinez-Uriegas et al. |
| 2003/0030754 | A1 | 2/2003 | Tsukada |
| 2003/0052904 | A1 | 3/2003 | Gu |
| 2003/0122842 | A1 | 7/2003 | Newman |
| 2003/0193598 | A1 | 10/2003 | Takemura |
| 2004/0113864 | A1 | 6/2004 | Nonaka |
| 2004/0131249 | A1 | 7/2004 | Sandrew |
| 2004/0196250 | A1 | 10/2004 | Mehrotra et al. |
| 2005/0134801 | A1 | 6/2005 | Bogdanowicz et al. |
| 2005/0147295 | A1 | 7/2005 | Kim et al. |
| 2007/0211074 | A1 | 9/2007 | Yeung |
| 2007/0291179 | A1 | 12/2007 | Sterling et al. |
| 2009/0109344 | A1 | 4/2009 | Ollivier et al. |
| 2009/0284554 | A1 | 11/2009 | Doser |

FOREIGN PATENT DOCUMENTS

| | | |
|---|---|---|
| JP | 7250346 | 9/1995 |
| JP | 10252157 | 9/1998 |
| JP | 11088672 | 3/1999 |
| JP | 2000132155 | 5/2000 |
| JP | 2002314831 | 10/2002 |
| JP | 2002314937 | 10/2002 |
| JP | 2004112169 | 4/2004 |
| JP | 2004228734 | 8/2004 |
| WO | WO0178368 | 10/2001 |
| WO | WO2006039357 | 4/2006 |
| WO | WO2006050305 | 5/2006 |

OTHER PUBLICATIONS

Office Actions for U.S. Appl. No. 10/593,195 Mailed Jan. 28, 2010 (Non Final), Mailed Jul. 9, 2010 (Final), Mailed Dec. 1, 2010 (Notice of Allowance) Mailed Mar. 17, 2011 (Abandonment).

Office Action for U.S. Appl. No. 12/083,026 mailed Oct. 31, 2011.

Office Action for U.S. Appl. No. 12/083,026 mailed Nov. 16, 2012.

Office Action for U.S. Appl. No. 12/083,026 mailed Jun. 2, 2011.

Office Actions for U.S. Appl. No. 12/083,026, Mailed Sep. 6, 2013.

* cited by examiner

CONVERTING A COLORIMETRIC TRANSFORM FROM AN INPUT COLOR SPACE TO AN OUTPUT COLOR SPACE

This application claims the benefit, under 35 U.S.C. §365 of International Application PCT/US2006/021485 filed Jun. 2, 2006, which was published in accordance with PCT Article 21(2) on Dec. 13, 2007 in English.

FIELD OF THE INVENTION

The present invention generally relates to post-production color information metadata and, more particularly, to a method, apparatus and system for converting an original calorimetric transform, also known as a color adjustment, of a sequence of images from an input color space into an output color space such that the transform survives a video distribution workflow.

BACKGROUND OF THE INVENTION

In recent years, the types of devices available for viewing images have increased dramatically. Consumers view images on several different output devices such as monitors, displays, televisions, cameras, printers, and other electronic devices. Whereas the Cathode Ray Tube (CRT) used to be the standard device for viewing images, today a user can also purchase a Liquid Crystal Display (LCD) or a Plasma Display Panel (PDP). The increasing variety of available devices, however, has produced a problem of color uniformity. Because of the mechanical differences between the different types of devices, colors are often displayed in different ways. That is, as the proliferation of available displays becomes more and more visible, the problem of color uniformity becomes more evident.

As such, in the new post-production environment, it has become more and more useful to be able to create color information metadata from, for example, a color transform tool that can be made available in a color management process from capture to post production. That is, as a device prepares to display a color, the display device requires accurate color information metadata to transform (adjust) content color to a desired color space before the device displays the desired color. For example, a visual comparison of a signal on different display types is a current practice in post-production. In such comparisons, a color transform (adjustment) is performed to attempt to match one display to the other or to a desired color space.

One color transformation technique involves the use of a 3-Dimensional lookup table (3D LUT). This technique uses a table defining a corresponding output color for each input color. 3D LUT's can today be automatically generated with available technology. The 3D LUT technique, however, cannot be carried with the content through the workflow (e.g., from capture to post processing) at least because of limitations in available display devices and, as such, the 3D LUT cannot be reused at the display decoding level. That is, the 3D LUT is not practical for an end-to-end design because the 3D LUT does not allow the deconstruction of sequential decisions integral to the 3D LUT and because the processing power associated with a 3D LUT is very intense and would not be practical for currently available consumer displays.

Another color transformation technique involves the use of Color Decision Lists (e.g., the American Society of Cinematographers Color Decision List (ASC CDL)). A Color Decision List (CDL) is comparable to an Edit Decision List (EDL) for representing a film or video edit except that a CDL is directed to color-grading choices. Unfortunately, most CDLs are proprietary to their respective portions of a workflow, which prevents the workflow from being seamless. That is, such a CDL cannot carry cinematographers' choices through the workflow. In addition, these CDLs only implement channel specific 1D LUTs that do not address cross talks between color channels (e.g., hue deviations).

SUMMARY OF THE INVENTION

In one embodiment of the present invention, a method for transforming a calorimetric adjustment of a sequence of images from an input color space into an output color space includes determining a transformation table for converting the input color space of the sequence of images to a desired output color space, applying a first order approximation to subsets of the sequence of images, the subsets of the sequence of images defined by the transformation table, and if the sequence of images has not reached convergence, applying a second order approximation to the subsets of the sequence of images.

In one embodiment of the present invention, the above describe method provides a sum of intermediate terms for defining color components of the output color space, where the number of the intermediate terms corresponds to the number of input color space components, and the intermediate terms are defined as a parametric function of one of the input color space components and the parameters of the parametric function are defined such that for all input colors, output colors are closest to the colors of the original colorimetric adjustment.

In an alternate embodiment of the present invention, a method for transforming a colorimetric adjustment of a sequence of images from an input color space into an output color space includes defining each component of the output color space by a sum of intermediate terms, wherein a number of the intermediate terms corresponds to a number of input color space components, defining each of the intermediate terms as a parametric function of one of the input color space components, and defining parameters of the parametric function such that for all input colors, output colors are closest to the colors of the original colorimetric transform. The combination of intermediate terms is then applied to the sequence of images for transforming the calorimetric adjustment of the sequence of images from the input color space into the output color space.

In an alternate embodiment of the present invention, a color adjustment device for transforming a colorimetric adjustment of a sequence of images from an input color space into an output color space includes a processor and a memory, for storing programs, algorithms and instructions. In the color adjustment device of the present invention, the processor is configured to determine a transformation table for converting the input color space of the sequence of images to a desired output color space, to apply a first order approximation to subsets of the sequence of images, the subsets of the sequence of images defined by the transformation table, to determine if the sequence of images has reached convergence, and in response to the sequence of images not having reached convergence (e.g., to within a predetermined threshold), to apply a second order approximation to the subsets of the sequence of images.

In an alternate embodiment of the present invention, a video distribution system includes a video capture device for capturing video, a color correction device for performing a calorimetric adjustment of the captured video and a color adjustment device configured to transform the colorimetric adjustment of the captured video from an input color space into an output color space.

BRIEF DESCRIPTION OF THE DRAWINGS

The teachings of the present invention can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for converting an original calorimetric transform that was made for color adjustment of a sequence of images from an input color space into an output color space in a concise manner that survives a video distribution workflow. Although the present invention will be described primarily within the context of a method, apparatus and system for deriving an extended color decision list from a three dimensional look-up-table, the specific embodiments of the present invention should not be treated as limiting the scope of the invention. It will be appreciated by those skilled in the art and informed by the teachings of the present invention that the concepts of the present invention can be advantageously applied in substantially any video distribution system for providing color management by converting an original calorimetric adjustment from an input color space into an output color space such that the converted color transform survives a video distribution workflow.

It should also be understood that the elements shown in the figures provided herewith may be implemented in various forms of hardware, software or combinations thereof. Preferably, these elements are implemented in a combination of hardware and software on one or more appropriately programmed general-purpose devices, which may include a processor, memory and input/output interfaces.

Figure 1:
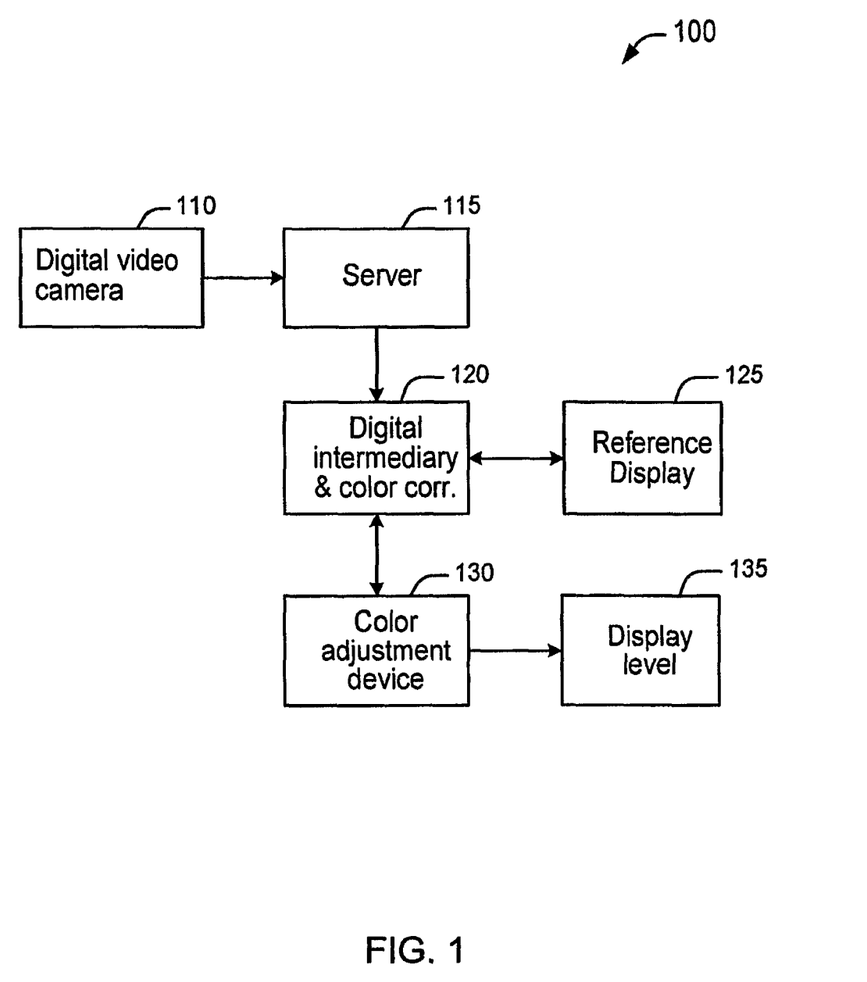
FIG. 1 depicts a high level block diagram of a video distribution system in which an embodiment of the present invention can be applied.

FIG. 1 depicts a high level block diagram of a video distribution system in which an embodiment of the present invention can be applied. In the system 100 of FIG. 1, a digital video camera 110 captures video content. The captured video content is translated into raw data representing three-color channel values per pixel and stored on, for example, a server 115. It should be noted, however, that although FIG. 1 depicts a digital video camera 110 for capturing video content, in an alternate embodiment of the present invention, video content may be captured by a film camera and translated using, for example, a telecine scanner. The output of the telecine scanner is then translated into raw data representing three-color channel values per pixel and stored on, for example, the server 115.

At some stage during content preparation in the system 100, which can be either at the capture stage or later during the process, there can exist a desire to change the "look" of the video content without altering the original captured data. The new look is intended to be transported through the workflow to a class of one or more consumer displays, to be replicated at the consumer display level with the desired "look". For example, in the video distribution system 100 of FIG. 1, the captured/stored video content is communicated to a digital intermediary 120 for making decisions on the color space (i.e., the "look") for the captured video content using for example any one of the color correction tools available on the market and a professional reference display 125 that is available on the market for digital intermediary workflow. A copy of the video content is then adjusted to incorporate the desired color space at the color adjustment device 130. For example, in one embodiment of the present invention, a color adjustment device 130 in accordance with the present invention creates three dimensional look-up-tables (3D LUTs) for each scene or particular sequence of contiguous images of the captured video content, and the 3D LUT is then transformed such that the transformed color adjustment 3D LUT can be implemented at a display level 135 to achieve consistency of the desired color intent for that particular image sequence. It must be understood that the color adjustment device 130 can be either a software running on a general purpose PC or hardware already used in a digital intermediary workflow, i.e. combined together with a color correction device, or an isolated combination of hardware and software that is connected via a network to a digital intermediary workflow, for example to its color correction device via Ethernet. The implementation choice depends on various workflow and financial parameters that are intimate to each specific workflow environment.

Figure 2:
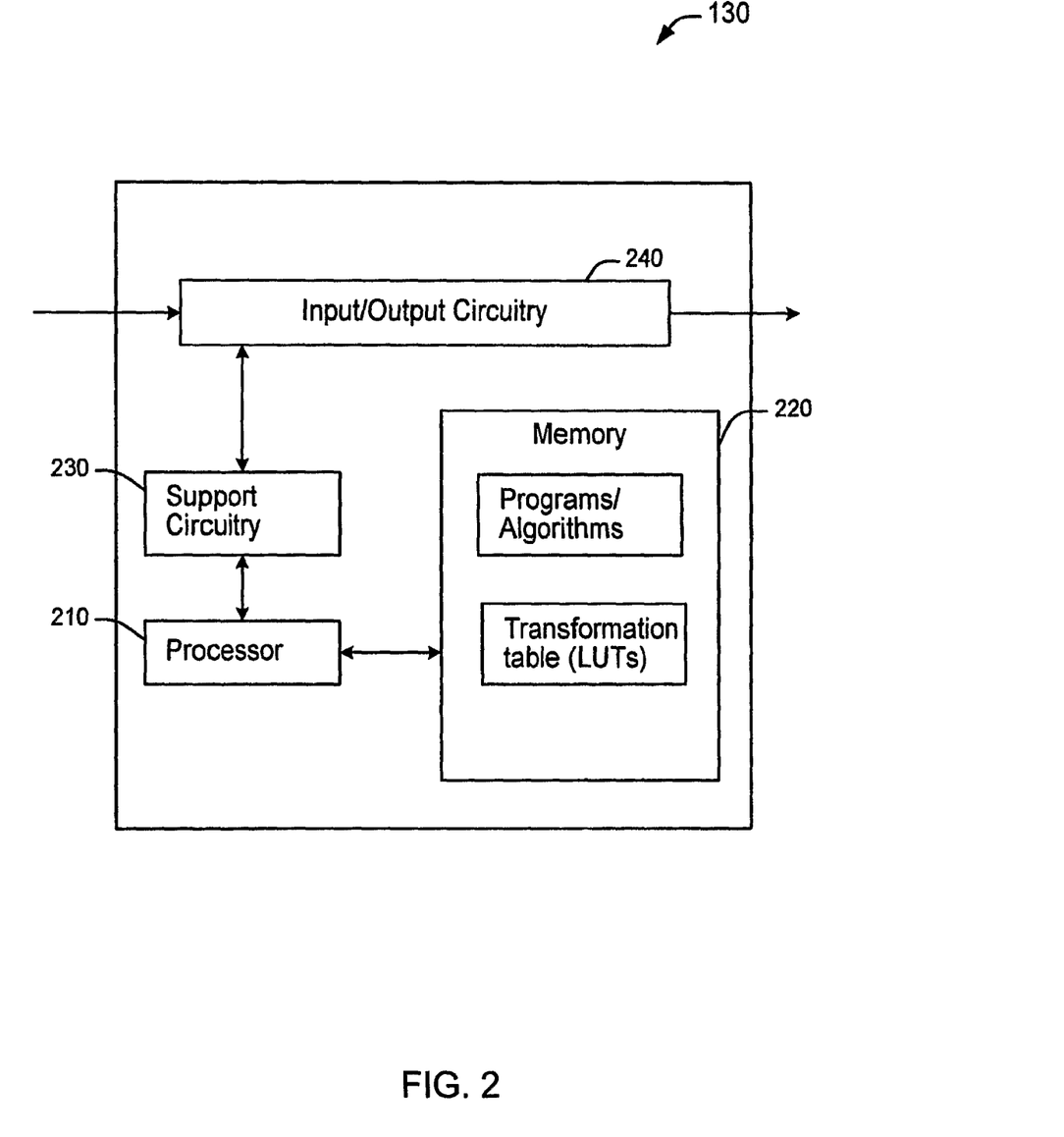
FIG. 2 depicts a high level block diagram of an embodiment of a color adjustment device suitable for use in the video distribution system of FIG. 1 in accordance with the present invention.

For example, FIG. 2 depicts a high level block diagram of an embodiment of a color adjustment device suitable for use in the video distribution system 100 of FIG. 1 in accordance with the present invention. The color adjustment device 130 of FIG. 2 comprises a processor 210 as well as a memory 220 for storing control programs, algorithms, LUTs and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The color adjustment device 130 also contains input-output circuitry 240 that forms an interface between the various respective functional elements communicating with the color adjustment device 130.

Although the color adjustment device 130 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

As previously described, the color adjustment device 130, in accordance with one embodiment of the present invention, creates three dimensional look-up-tables (3D LUTs) for each scene or particular sequence of contiguous images of the captured video content, and the 3D LUT is then transformed such that the transformed color adjustment 3D LUT can be implemented at a display level 135 to achieve consistency of the desired color intent for that particular image sequence. More specifically, the color adjustment device 130 is configured to transform an original colorimetric adjustment from an input color space into an output color space by, in one embodiment of the present invention, defining each component of the intended output color space by a sum of intermediate terms, wherein a number of the intermediate terms corresponds to a number of input color space components, defining each of the intermediate terms as a parametric function of one of the input color space components, and defining parameters of the parametric function such that for all input colors, the output colors are closest to the colors of the original calorimetric adjustment. The determinations made and processes implemented by the color adjustment device 130 will be described in greater detail below.

The video content and transformed 3D LUTs are then distributed to the display level for display. For example, in one embodiment of the present invention the video content and transformed 3D LUTs are burned into a DVD at a DVD mastering stage or any mastering for new distribution venues like video-on-demand, mobile applications and the like. An important aspect of the present invention is that color adjustment information is made available wherever it may be needed within a video content distribution workflow. In addition, the color adjustment information is compressed such that the information becomes practical for use in substantially any working environment (i.e., post-processing image transforms, metadata creation for consumer display rendering). In accordance with the present invention, both color adjustments (e.g., 3D LUT and compressed LUT) are made available as long as possible (i.e., in a post-production environment) while only transporting the compressed LUTs of the present invention in an environment that has limited processing capabilities (i.e., in a display device).

In one embodiment of the present invention, a mathematical and statistical method is proposed which is implemented by, for example the color adjustment device 130, in a post-production environment for compressing a created 3D LUT, which can be of any size, for example, 16×16×16 values (4 bits) and 256×256×256 values (8 bits) or even larger values for future applications such as 10 bit, 12 bit or larger bit per channel.

A 3D LUT can be described as a collection of values, (R'ijk, G'ijk, B'ijk), where i, j and k can take any value between 0 and 255 in the case of 256 plotting points (8 bits) or any other maximum depending on the size of the 3D LUT. R', G' and B' represent the 3 main channels of the image data in a particular color space reference (e.g., red, green and blue or XYZ color space in digital imaging). The three variables of a 3D LUT do not necessarily imply linear representation of the plotted values. For example, a 3D LUT can be configured such that most of the critical colors of a particular scene (i.e., flesh tones) have sufficient incremental detail to comply with the original intent of the scene when a color transform or adjustment is applied in accordance with the present invention. However, the teachings of the present invention do not address this issue and assume that a 3D LUT that is created for each scene of a captured video content in accordance with the present invention contains the appropriate color accuracy embedded within, including out of gamut mapping if appropriate.

In one embodiment of the present invention, a 3D LUT is simplified by considering a "Ray Box" algorithm. Such a "Ray Box" algorithm is described in commonly assigned PCT Patent Application No. PCT/US2005/08918, filed Mar. 17, 2005, which is herein incorporated by reference in its entirety. The "Ray Box" algorithm can be applied, for example at the display level. The original 3D LUT applies to visual color transforms or adjustments either outside of any creative color transform process (i.e. display matching, device calibration, color space changes) or in a creative color transform that is "look" related (i.e. the director of photography of a film production may want a specific look and thus uses this invention to burn his artistic intent in an efficient and flexible color transform or adjustment). The "Ray Box" algorithm, as described in one embodiment of PCT Patent Application No. PCT/US2005/08918, has a set of user knobs that tune the coefficients of a matrix composed of 3 diagonal coefficients ($L_{RR}$, $L_{GG}$, $L_{BB}$) and of 6 non-diagonal coefficients ($L_{RG}$, $L_{RB}$, $L_{GR}$, $L_{GB}$, $L_{BR}$, $L_{BG}$) in real-time, in order to change the look and match it to a desired creative or non-creative look as explained above.

In the embodiment of the present invention described above, a modified Ray Box is implemented either inside of a display unit or as a decoder that modifies the content prior to displaying the content. In addition, in various embodiments, the described knobs are conceptually modified to be implemented by software that will obtain the same effect as physical knobs, using information that is transported to a display with the video distributed content and interpreted by the software to recompose the desired coefficients to the color channels before displaying the content. Such an implementation is described in commonly assigned PCT Patent Application No. PCT/US2005/039576, filed Oct. 28, 2005, which is herein incorporated by reference in its entirety.

In accordance with one embodiment of the present invention, a specific 3D LUT represents, for example, the difference between the desired look as set in post-production and the look that is represented by the combination of the video distributed content and the display before applying any correction at the display level. As such, each of the values of a 3D LUT can be represented as characterized in equations one (1), two (2) and three (3), which follow:

$$R'ijk = L_{RR(i)} + L_{RG(j)} + L_{RB(k)} \tag{1}$$

$$G'ijk = L_{GR(i)} + L_{GG(j)} + L_{GB(k)} \tag{2}$$

$$B'ijk = L_{BR(i)} + L_{BG(j)} + L_{BB(k)}. \tag{3}$$

The diagonal coefficients of the matrix presented above are depicted as the linear 1 dimensional look-up-tables (1D LUTs) for each of the three channels (red, green and blue) and the non-diagonal coefficients are depicted as cross talks. In accordance with the present invention, substantially all film content, digitally captured video content, computer generated video content, or visual effects resulting from a mix of these types of content creation, can be represented accurately from a specific visual reference to a next (i.e., from a display to a next different display) by a specific approximation of both the diagonal and non-diagonal coefficients on a scene-by-scene basis, take-by-take basis, or any other adequate sequence of images basis.

Although an embodiment of the present invention is described above as implementing a "Ray Box" algorithm for simplifying a 3D LUT, that specific embodiment of the present invention should not be treated as limiting the scope of the invention. That is, any combination of a color-correction and/or color-transform process or tool that is used to adjust color with no artistic intent or otherwise to artistically modify a "look" can still be represented by a general 3D LUT in accordance with the present invention.

In accordance with one embodiment of the present invention, a 3D LUT representing a "look change" or color adjustment is automatically compressed by an algorithm and represented as a first approximation by a matrix composed of diagonal coefficients (i.e., three different 1D LUTs). The diagonal coefficients are expressed in mathematical terms (e.g., ASC CDL values, slope, offset, power and the like) such that programmable chips can easily process the mathematical terms. Additionally, and in accordance with one embodiment of the present invention, a second level of approximation includes creating non-diagonal coefficients according to the "Ray Box" description (e.g., six 1D LUTs). The non-diagonal coefficients are also expressed in mathematical terms such that programmable chips can easily process the mathematical terms In one embodiment of the present invention, if an ASC CDL is described as Rout=Clamp ((Rin*slope)+offset)$^{power}$ or Rout=f(Rin, Slope, Offset, Power), then each of the parameters of a 3D LUT with respect to the CDL functions can be characterized according to equations four (4), five (5) and six (6), which follow:

$$R'ijk = f(i, S1, O1, P1) \quad (4)$$

$$G'ijk = f(j, S2, O2, P2) \quad (5)$$

$$B'ijk = f(k, S3, O3, P3). \quad (6)$$

In equations (4), (5) and (6) above, f depicts a known function which depicts the ASC CDL. As previously stated however, the concepts of the present invention are not limited to ASC CDL functions. That is, the concepts of the present invention may be applied to substantially any function, f, with a number of known parameters such as lift, gain, gamma or even printer correction values in a digital intermediary environment that does not implement ASC CDL functions. For example, analytic functions found in the literature to represent a typical "toe" or "shoulder" behavior in film printing can also be used as replacements or complements of the ASC CDL in another embodiment of the present invention.

In equations (4), (5) and (6) above, i depicts the input value for the Red channel (R), j depicts the input value for the Green channel (G) and k depicts the input value for the Blue channel (B). In one embodiment of the present invention and analyzing the Red Channel (R), the 3D LUT coefficient variance for all possible values of i between 0 and 255 (or any other number of Red channel values depending on the number of bits) is considered. The 3D LUT coefficient variance for all possible values of i can be analyzed as a function of j and k as characterized by equation seven (7), which follows:

$$Var(i)\{R'ijk - f(i, S, O, P)\} = E_R^2(j, k)(S, O, P) \quad (7)$$

In equation (7) above, Var(i)(X) can be any analytical variance for X regarding all values of i. In order to optimize the Red channel (R), a red-channel related cost function of slope, offset and power can be characterized according to equation eight (8), which follows:

$$F_R(S, O, P) = \text{Var}(i, j, k)\{R'_{ijk} - f(i, S, O, P)\} \quad (8)$$

$$= \sum_{i,j,k} \left(R'_{ijk} - f(i, S, O, P)\right)^2.$$

In accordance with the present invention, the cost function of equation (8) is optimized such that the triplet $(S_R, O_R, P_R)$ results in a minimum cost. To achieve such a result, the inventors propose a two-step method. In a first step, a first solution (S, O, P) for the Red channel (R) with a given j, k is determined using a partial cost function characterized according to equation nine (9), which follows:

$$F'_R(j, k, S, O, P) = \text{Var}(i)\{R'_{ijk} - f(i, S, O, P)\} \quad (9)$$

$$= \sqrt{\sum_i (R'_{ijk} - f(i, S, O, P))^2 \Big/ \sum_i 1}.$$

In a second step, the full cost function of equation (8) is then used to determine the solution $(S_R, O_R, P_R)$ for the Red channel (R) with a minimal cost. The partial cost function of equation (9) and the full cost function of equation (8) result in a minimal overall cost function for the Red channel (R) according to equation ten (10), which follows:

$$e(S_R, O_R, P_R) = F_R(S_R, O_R, P_R) \quad (10)$$

$$= \sum_{i,j,k} (R'_{ijk} - f(i, S_R, O_R, P_R))^2.$$

As such, the Red channel (R) related partial costs for any value of j, k from green and blue can be characterized according to equation eleven (11), which follows:

$$e_R(j, k, S_R, O_R, P_R) = F'_R(j, k, S_R, O_R, P_R) \quad (11)$$

$$= \sqrt{\sum_i (R'_{ijk} - f(i, S_R, O_R, P_R))^2 \Big/ \sum_i 1}.$$

The process described above is then repeated for the Green channel (G) and the Blue channel (B) to determine the $(S_G, O_G, P_G)$ and $(S_B, O_B, P_B)$ partial costs which can be characterized according to equations twelve (12) and thirteen (13), respectively, which follow:

$$e_G(i, k, S_G, O_G, P_G) = F'_G(i, k, S_G, O_G, P_G) \quad (12)$$

$$= \sqrt{\sum_j (G'_{ijk} - f(j, S_G, O_G, P_G))^2 \Big/ \sum_j 1}$$

$$e_B(i, j, S_B, O_B, P_B) = F'_B(i, j, S_B, O_B, P_B) \quad (13)$$

$$= \sqrt{\sum_k (B'_{ijk} - f(k, S_B, O_B, P_B))^2 \Big/ \sum_k 1}.$$

Equation (11), equation (12) and equation (13) are applied to create three 1D LUTs, one for each of the R, G, and B channels, which when expressed in ASC CDL format can be approximated according to equations fourteen (14), fifteen (15) and sixteen (16), which follow:

$$R'ijk \sim f(i, S_R, O_R, P_R) + e_R(j, k, S_R, O_R, P_R) \quad (14)$$

$$G'ijk \sim f(j, S_G, O_G, P_G) + e_G(i, k, S_G, O_G, P_G) \quad (15)$$

$$B'ijk \sim f(k, S_B, O_B, P_B) + e_B(i, j, S_B, O_B, P_B). \quad (16)$$

If the typical statistical errors (i.e., the square root of the minimum variance) depicted by the $e_x(\ )$ values are neglected, the first approximation in accordance with the present invention, is achieved as a combination of three 1D LUT expressions of the 3D LUT on a scene by scene basis, which can be characterized according to equations seventeen (17), eighteen (18) and nineteen (19), which follow:

$$R'ijk \sim f(i, S_R, O_R, P_R) \qquad (17)$$

$$G'ijk \sim f(j, S_G, O_G, P_G) \qquad (18)$$

$$B'ijk \sim f(k, S_B, O_B, P_B). \qquad (19)$$

Equations (17), (18) and (19) depict an embodiment of the diagonal coefficients expressed in mathematical terms that can be easily processed by programmable chips in accordance with an embodiment of the first approximation of the present invention.

Using equations (14), (15) and (16), the non-diagonals can be derived in accordance with the second approximation of the present invention. More specifically, because the $e_x(x,x)$ values only involve the RGB values from the remaining channels (e.g., j and k), such values can be considered cross talk of a second order of magnitude in any visual and non artistic color correction mechanism.

That is and again, considering the simplification of a 3D LUT using a Ray Box algorithm and equations (1), (2) and (3), the diagonal elements can be characterized according to equations twenty (20), twenty-one (21) and twenty-two (22), which follow:

$$L_{RR(i)} = f(i, S_R, O_R, P_R) \qquad (20)$$

$$L_{GG(j)} = f(j, S_G, O_G, P_G) \qquad (21)$$

$$L_{BB(k)} = f(k, S_B, O_B, P_B) \qquad (22)$$

Using equations (14), (15) and (16) and equations (20), (21) and (22), the non-diagonals can be derived and can be characterized according to equations twenty-three (23), twenty-four (24) and twenty-five (25), which follow:

$$L_{RG(j)} + L_{RB(k)} = e_R(j, k, S_R, O_R, P_R) \qquad (23)$$

$$L_{GR(i)} + L_{GB(k)} = e_G(i, k, S_G, O_G, P_G) \qquad (24)$$

$$L_{BR(i)} + L_{BG(j)} = e_B(i, j, S_B, O_B, P_B). \qquad (25)$$

Assuming that the diagonal coefficients are of first order approximation, the non-diagonal coefficients are assumed to be of higher order approximation and remain small compared to the diagonal coefficients. As such, in one embodiment of the present invention, a second order polynomial form approximation of the non-diagonal coefficients can be characterized according to equations twenty-six (26) through thirty-one (31), which follow:

$$L_{RG(j)} = a_{RG}*j^2 + b_{RG}*j \qquad (26)$$

$$L_{GR(i)} = a_{GR}*i^2 + b_{GR}*i \qquad (27)$$

$$L_{BR(i)} = a_{BR}*i^2 + b_{BR}*i \qquad (28)$$

$$L_{RB(k)} = a_{RB}*k^2 + b_{RB}*k \qquad (29)$$

$$L_{GB(k)} = a_{GB}*k^2 + b_{GB}*k \qquad (30)$$

$$L_{BG(j)} = a_{BG}*j^2 + b_{BG}*j. \qquad (31)$$

Although the non-diagonal approximation above is depicted as being solved using a second order polynomial form, the concepts of the present invention are not so limited. That is, in alternate embodiments of the present invention, the non-diagonal approximation of the present invention can be accomplished using a higher or lower order model. In addition, the non-diagonal approximation can also be accomplished using function types other than a polynomial function.

However, using second order approximations, a relationship between the diagonal approximations and the non-diagonal approximations can be characterized according to equations thirty-two (32), thirty-three (33) and thirty-four (34), which follow:

$$L_{RG(j)}^2 + L_{RB(k)}^2 << L_{RR(i)}^2 \qquad (32)$$

$$L_{GR(i)}^2 + L_{GB(k)}^2 << L_{GG(j)}^2 \qquad (33)$$

$$L_{BR(i)}^2 + L_{BG(j)}^2 << L_{BB(k)}^2. \qquad (34)$$

Equations (32), (33) and (34) are solved using a statistical method to find the minimum variance in accordance with equations thirty-five (35), thirty-six (36) and thirty-seven (37), which follow:

$$\text{Var}(jk)\{e_R(j, k, S_R, O_R, P_R) - (a_{RG}*j^2 + b_{RG}*j) - (a_{RB}*k^2 + b_{RB}*k)\} \qquad (35)$$

(over all possible values for j and k and of polynomial coefficients $a_{RG}$, $b_{RG}$, $a_{RB}$, $b_{RB}$)

$$\text{Var}(ik)\{e_G(i, k, S_G, O_G, P_G) - (a_{GR}*i^2 + b_{GR}*i) - (a_{GB}*k^2 + b_{GB}*k)\} \qquad (36)$$

(over all possible values for i and k and of polynomial coefficients $a_{GR}$, $b_{GR}$, $a_{GB}$, $b_{GB}$)

$$\text{Var}(ij)\{e_B(i, j, S_B, O_E, P_B) - (a_{BR}*i^2 + b_{BR}*i) - (a_{BG}*j^2 + b_{BG}*j)\} \qquad (37)$$

(over all possible values for i and j and of polynomial coefficients $a_{BR}$, $b_{BR}$, $a_{BG}$, $b_{BG}$).

The solution of the applied statistical method results in three respective sets of four (4) polynomial coefficients that are used to replace plotted non-diagonal values. As such and in accordance with the present invention, a 3D LUT is represented with an approximation of first and second order compressed values (i.e., nine 1D LUT mathematical coefficients) which can be characterized according to equations thirty-eight (38), thirty-nine (39) and forty (40), which follow:

$$R'ijk \sim f(i, S_R, O_R, P_R) + (a_{RG}*j + b_{RG})*j + (a_{RB}*k + b_{RB})*k \qquad (38)$$

$$G'ijk \sim (a_{GR}*i + b_{GR})*i + f(j, S_G, O_G, P_G) + (a_{GB}*k + b_{GB})*k \qquad (39)$$

$$B'ijk \sim (a_{BR}*i + b_{BR})*i + (a_{BG}*j + b_{BG})*j + f(k, S_B, O_B, P_B). \qquad (40)$$

Figure 3:
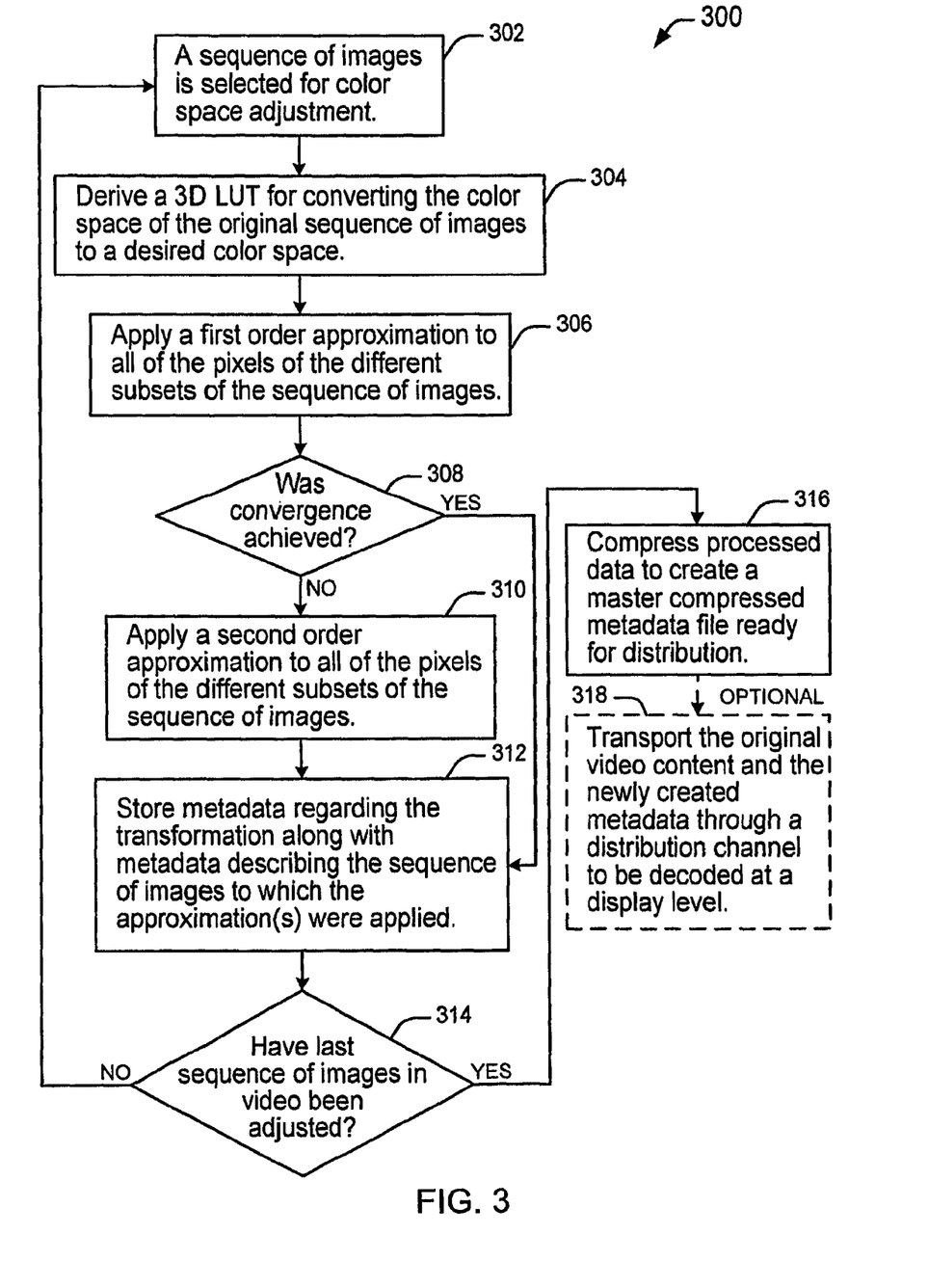
FIG. 3 depicts a flow diagram of a method for converting an original calorimetric transform (adjustment) from an input color space into an output color space in accordance with an embodiment of the present invention.

FIG. 3 depicts a flow diagram of a method for converting an original colorimetric adjustment from an input color space into an output color space such that the adjustment survives a video distribution workflow in accordance with an embodiment of the present invention. The method 300 of FIG. 3 begins at step 302, where a sequence of images of a video content are selected for color space adjustment. The method 300 then proceeds to step 304.

At step 304, a 3D LUT is derived for converting the color space ("look") of the original sequence of images to the desired color space ("look"). In one embodiment of the present invention, the 3D LUT is derived using tools readily available in the art. The method then proceeds to step 306.

At step 306, a first order algorithm approximation in accordance with the present invention and as described above is applied to all of the pixels of different subsets of the sequence of images. For example, in one embodiment of the present invention, the first order algorithm approximation is applied to a subset of the first ten (10) frames from the selected sequence of images. The algorithm is them applied to the first twenty (20) frames and then to the first thirty (30) frames until the result of the algorithm is statistically stable for all of the pixels of a sequence of images. That is, the first order algorithm is applied to the various subsets of the sequence of images until the difference between the sets of parameters from one algorithm application to the next is considered insignificant (convergence). For example, a user can establish a variance threshold which will indicate the end of the algorithm application process when the threshold is attained. The method 300 then proceeds to step 308.

At step 308, it is determined whether convergence was obtained via application of the first order algorithm. If convergence was not obtained, the method proceeds to step 310. If convergence was obtained, the method skips to step 312.

At step 310, if the convergence was not obtained after processing all of the subsets of the selected sequence of images (i.e., because threshold cannot be obtained), then the first order approximation is considered not sufficient and a second order algorithm approximation, in accordance with the present invention, is applied to all of the pixels of the different subsets of the sequence of images as described above. The computation mechanism is repeated until the threshold convergence is obtained. Typically, the application of the first order algorithm can be considered sufficient by a user, but in alternate embodiments when very accurate color mapping is desired due to the need for very specific looks and where color cross talk is an important component of the look, the second order algorithm is applied in accordance with the present invention. The method 300, then proceeds to step 312.

At step 312, once the computations have been processed as described above, the resulting parameters, which are now considered "compressed LUT metadata", are stored in a database along with the metadata describing the selected sequence of images to which the algorithm(s) were applied. For example, the stored metadata describing the selected sequence of images to which the algorithm(s) were applied can contain information including first and last frame keycode/timecode numbers, and the like. The method then proceeds to step 314.

At step 314, it is determined if the last sequence of images in the video content to be adjusted has been processed. If image sequences of the video content still need to be processed, the method 300 returns to step 302. If the last image sequence of the video content has been processed, the method 300 proceeds to step 316.

At step 316, the processed data is compressed to create, for example, a master compressed file ready for distribution. That is, each sequence of the selected images will have relevant compressed LUT metadata associated with it, for example, either in-band (multiplexed as part of image packets) or out-of-band (on a separate stream, with relevant synchronization information to the images).

Optionally, the method 300 proceeds to step 318, where the original video content and the newly created metadata are transported through a distribution channel to be decoded at a display level. That is, the original video content and the metadata, created in accordance with the present invention, will be decoded by a combination of a regular decoder and a "modified Ray-box" in accordance with the present invention. That is, in order to apply the original desired look, the modified Ray-box decoder of the present invention calculates, from the compressed LUT metadata and from the original content, the new color components for each sequence of images at the decoding stage and in real-time. Then the new pixel values are then transferred to a display engine at the display level for rendering.

In an alternate embodiment of the present invention, an alternative type of cost function is used for optimizing the channels for approximation of the first and second compressed values of the present invention. The alternative cost function, to be applied as described above and in accordance with the present invention, can be characterized according to equation forty-one (41), which follows:

$$F_R''(i, S, O, P) = a\sum_{i,j,k}(R'_{ijk} - f(i, S, O, P))^2 + \quad (41)$$
$$(1-a)\text{MAX}_{ijk}(R'_{ijk} - f(i, S, O, P)^2).$$

In equation (41), 'a' depicts a constant between 0 and 1. The cost function of equation (41) takes into account not only a mean square error but also a maximum error which can be of importance for practical applications.

In an alternate embodiment of the present invention, another alternative type of cost function is used for optimizing the channels for approximation of the first and second compressed values of the present invention. The alternative cost function, to be applied as described above and in accordance with the present invention, can be characterized according to equation forty-two (42), which follows:

$$F_R'''(i, S, O, P) = \sum_{i,j,k} g(R'_{ijk} - f(i, S, O, P)). \quad (42)$$

In equation (42), g( ) depicts a generalized nonlinear function allowing small terms and large terms to be weighed differently. In one example, a function for g( ) can be characterized according to function forty-three (43), which follows:

$$g(u) = \begin{cases} u^2 & u \leq u_o \\ u^4 & \text{else} \end{cases} \quad (43)$$

In function (43) above, $u_o$ depicts a reasonable threshold between usual errors and large errors. The function (43) calculates standard squared error for usual errors while more weight is give to large errors.

Having described preferred embodiments for a method, apparatus and system for converting an original calorimetric adjustment of a sequence of images from an input color space into an output color space such that the adjustment survives a video distribution workflow (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. As such, the appropriate scope of the invention is to be determined according to the claims, which follow.

The invention claimed is:

1. A method for transforming a colorimetric adjustment of a sequence of images from an input color space into an output color space comprising:
   determining a transformation table for converting the input color space of said sequence of images to a desired output color space;
   applying a first order approximation to at least one subset of said sequence of images, the subsets of said sequence of images defined by said transformation table; and determining if convergence between at least two of the subsets of said sequence of images has been reached and if not, applying a second order approximation to at least one of the subsets of said sequence of images;
wherein the determining and applying steps are performed by at least a processor.

2. The method of claim 1, wherein said method for transforming provides a sum of intermediate terms for defining color components of said output color space, wherein the number of said intermediate terms corresponds to the number of input color space components.

3. The method of claim 2, wherein said intermediate terms are defined as a parametric function of one of said input color space components.

4. The method of claim 3, wherein parameters of said parametric function are defined such that for all input colors, output colors are closest to the colors of said original colorimetric adjustment.

5. The method of claim 1, wherein said first order approximation compresses said transformation table to determine diagonal coefficients capable of being expressed in mathematical terms that are able to be implemented in programmable circuits.

6. The method of claim 1, wherein said second order approximation determines non-diagonal coefficients capable of being expressed in mathematical terms that are able to be implemented in programmable circuits.

7. The method of claim 6, wherein said non-diagonal coefficients depict channel cross talk.

8. The method of claim 1, comprising compressing information regarding said approximated sequence of images to create a compressed metadata file.

9. The method of claim 8, comprising communicating said compressed metadata file to a display level.

10. The method of claim 8, comprising storing said compressed metadata file.

11. The method of claim 10, comprising storing information regarding said original sequence of images along with said compressed metadata file.

12. The method of claim 1, wherein said transformation table comprises a multi-dimensional look-up-table.

13. The method of claim 12, wherein said multi-dimensional look-up-table comprises a three-dimensional look-up table.

14. The method of claim 12, wherein said multi-dimensional look-up-table comprises a respective look-up-table for different color components of said sequence of images.

15. The method of claim 1, wherein said determined convergence between at least two of the subsets of said sequence of images is compared to a threshold to determine if convergence has been achieved.

16. A method for transforming a colorimetric adjustment of a sequence of images from an input color space into an output color space comprising:
defining components of said output color space by a combination of intermediate terms, wherein a number of said intermediate terms corresponds to a number of input color space components;
defining said intermediate terms as a function of at least one of said input color space components;
defining parameters of said function such that for all input colors, output colors are closest to the colors of said original colorimetric adjustment; and
applying said combination of intermediate terms to said sequence of images for transforming the colorimetric adjustment of said sequence of images from the input color space into the output color space;
wherein the defining and applying steps are performed by at least a processor.

17. The method of claim 16, wherein said combination of intermediate terms defines a multi-dimensional look-up-table.

18. The method of claim 16, wherein said function comprises a parametric function.

19. An apparatus for transforming a colorimetric adjustment of a sequence of images from an input color space into an output color space, comprising:
a memory for storing programs, algorithms and image data, and
a processor configured to:
determine a transformation table for converting the input color space of said sequence of images to a desired output color space;
apply a first order approximation to at least one subset of said sequence of images, the subsets of said sequence of images defined by said transformation table;
determine if convergence between at least two of the subsets of said sequence of images has been reached; and
in response to said convergence not having been reached, apply a second order approximation to at least one of the subsets of said sequence of images.

20. The apparatus of claim 19, wherein at least one of said first order approximation and said second order approximation is stored in said memory.

21. The apparatus of claim 19, wherein said transformation table comprises a look-up-table.

22. A video distribution system, comprising:
an image capture device for capturing a sequence of images;
a color correction device for performing a colorimetric adjustment of at least one captured image; and
a color adjustment device configured to transform said colorimetric adjustment of said captured sequence of images from an input color space into an output color space by:
determining a transformation table for converting the input color space of said sequence of images to a desired output color space;
applying a first order approximation to at least one subset of said sequence of images, the subsets of said sequence of images defined by said transformation table; and
determining if convergence between at least two of the subsets of said sequence of images has been reached and if not, applying a second order approximation to at least one of the subsets of said sequence of images.

23. The video distribution system of claim 22, further comprising a reference display for assisting in said colorimetric adjustment of said captured image.

24. The video distribution system of claim 22, further comprising a display for displaying said transformed colorimetric adjustment in said output color space.

25. The video distribution system of claim 22, wherein said transformed colorimetric adjustment is communicated to a display level for display in said output color space.

* * * * *